Inventor
F. Haver
By Wenderoth, Lind & Ponack
Attorneys

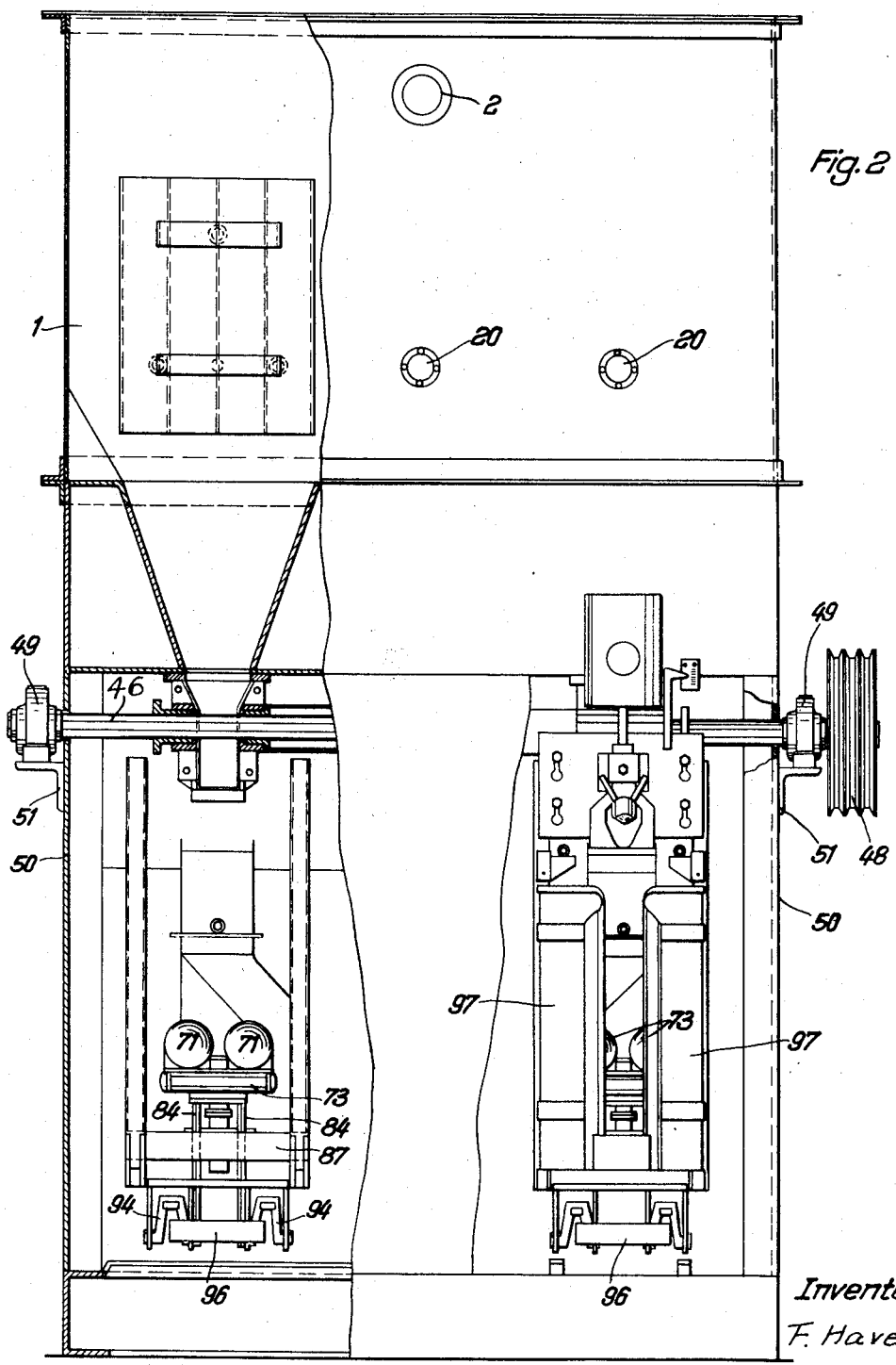

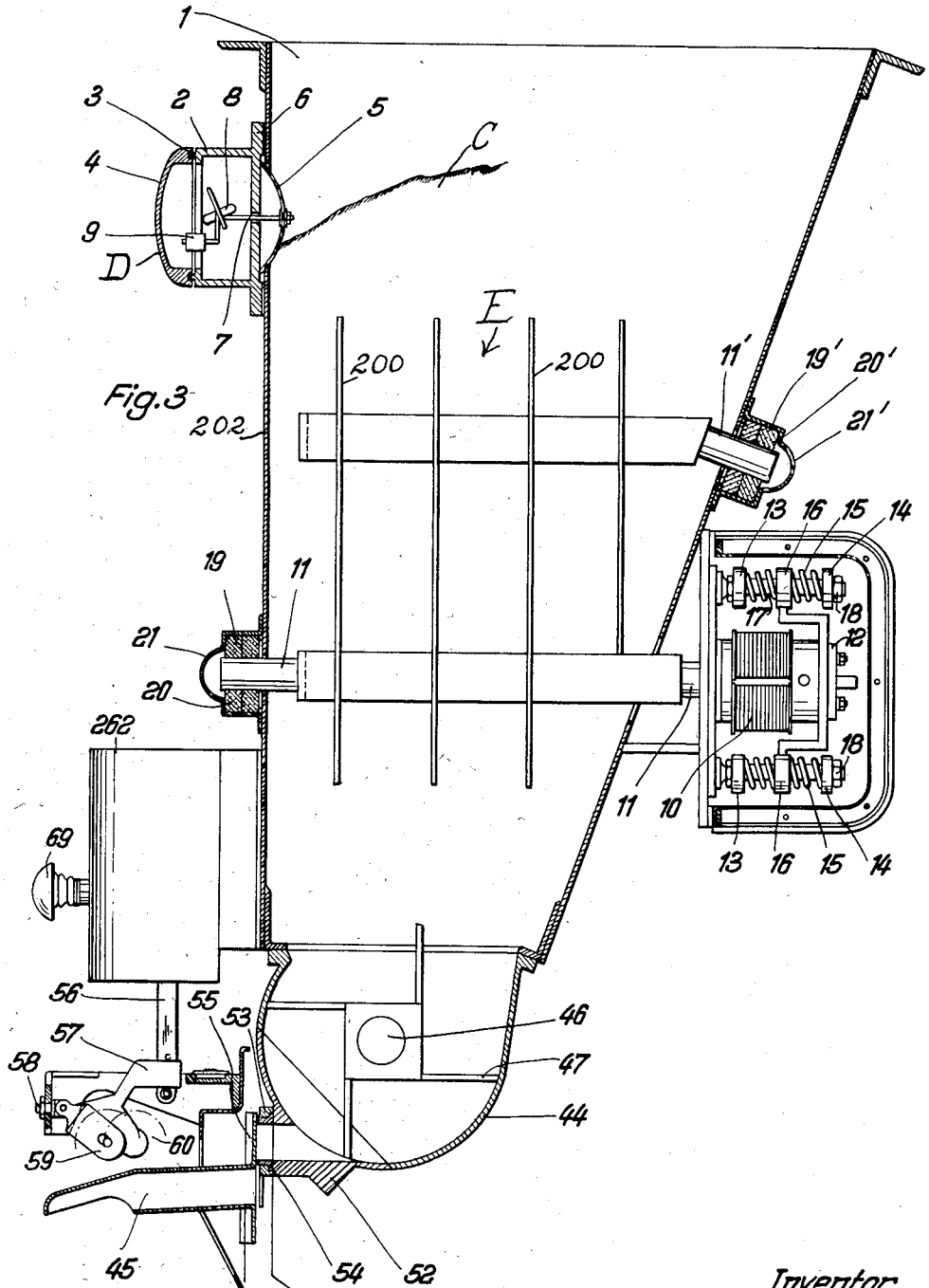

June 7, 1960  F. HAVER  2,939,494
METHOD OF TREATING FILLING MATERIAL AND AN APPARATUS
FOR CARRYING OUT THIS METHOD
Filed July 30, 1954  10 Sheets-Sheet 4
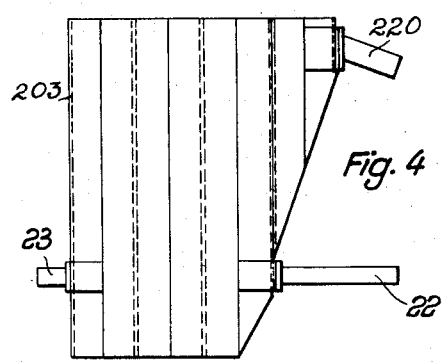
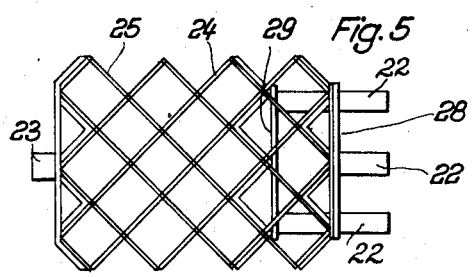
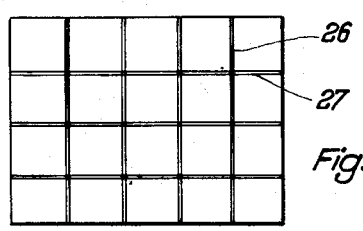
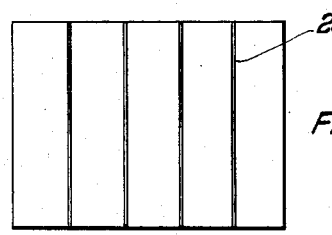
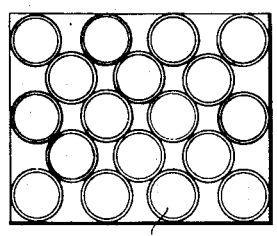
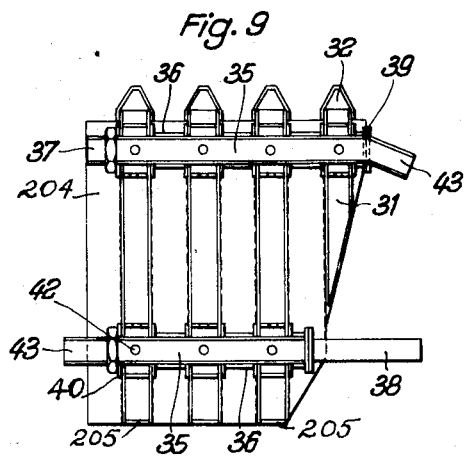
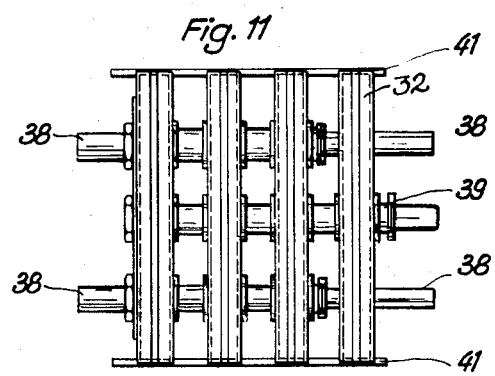
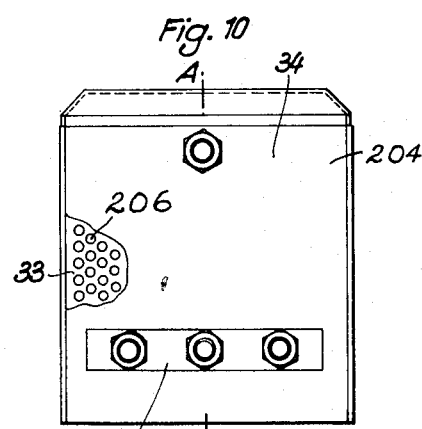
Inventor
F. Haver
By Wenderoth, Lind & Ponack
Attorneys

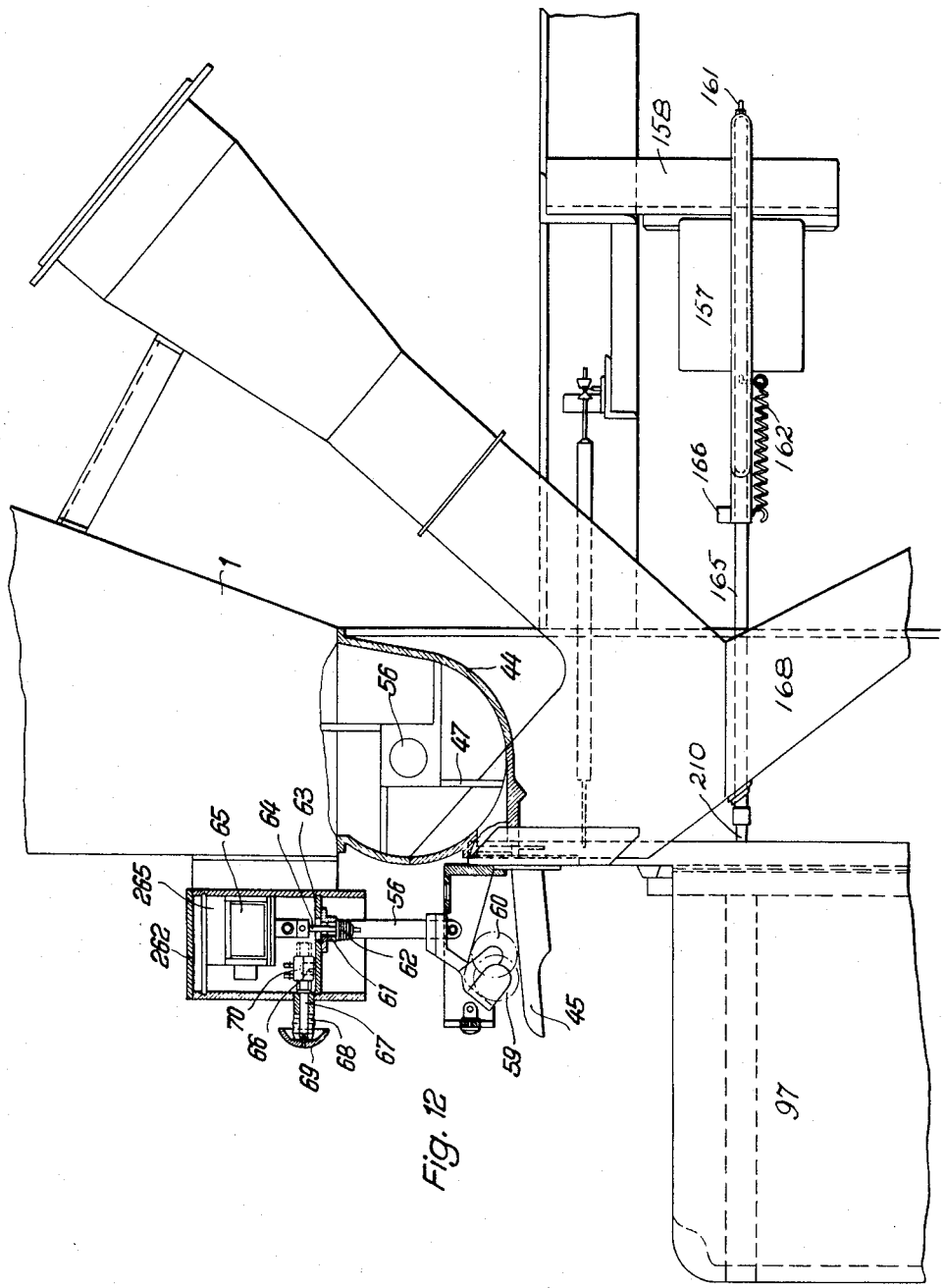

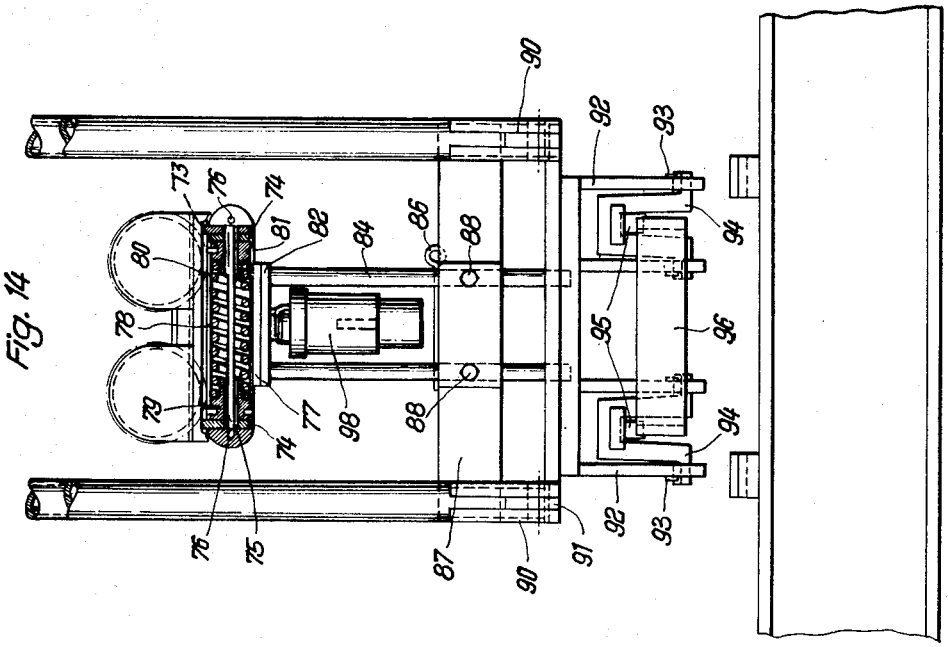
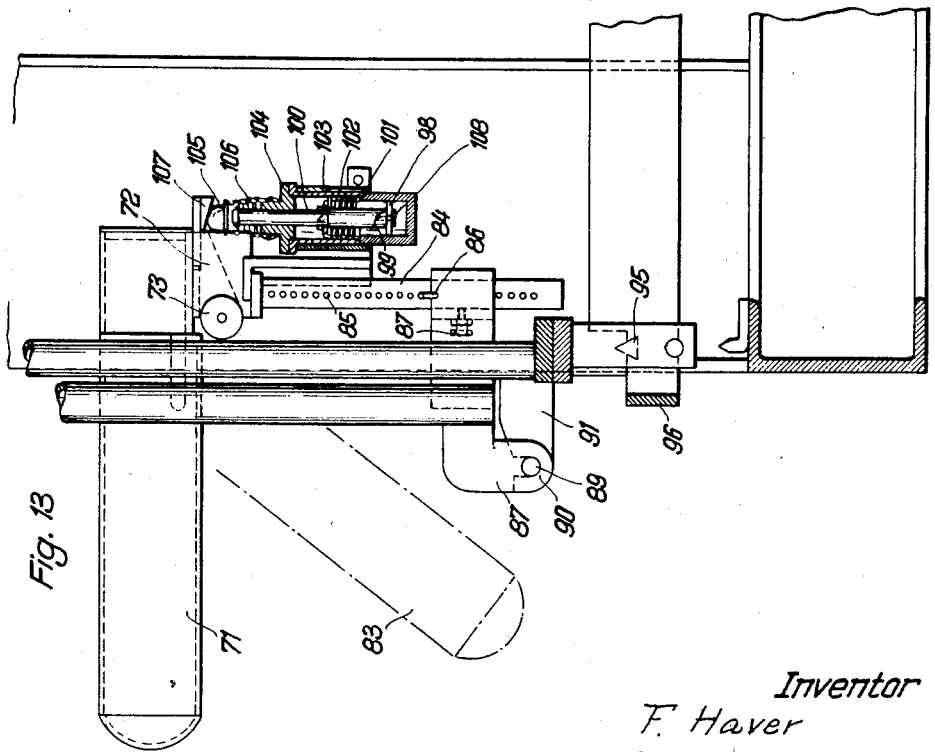

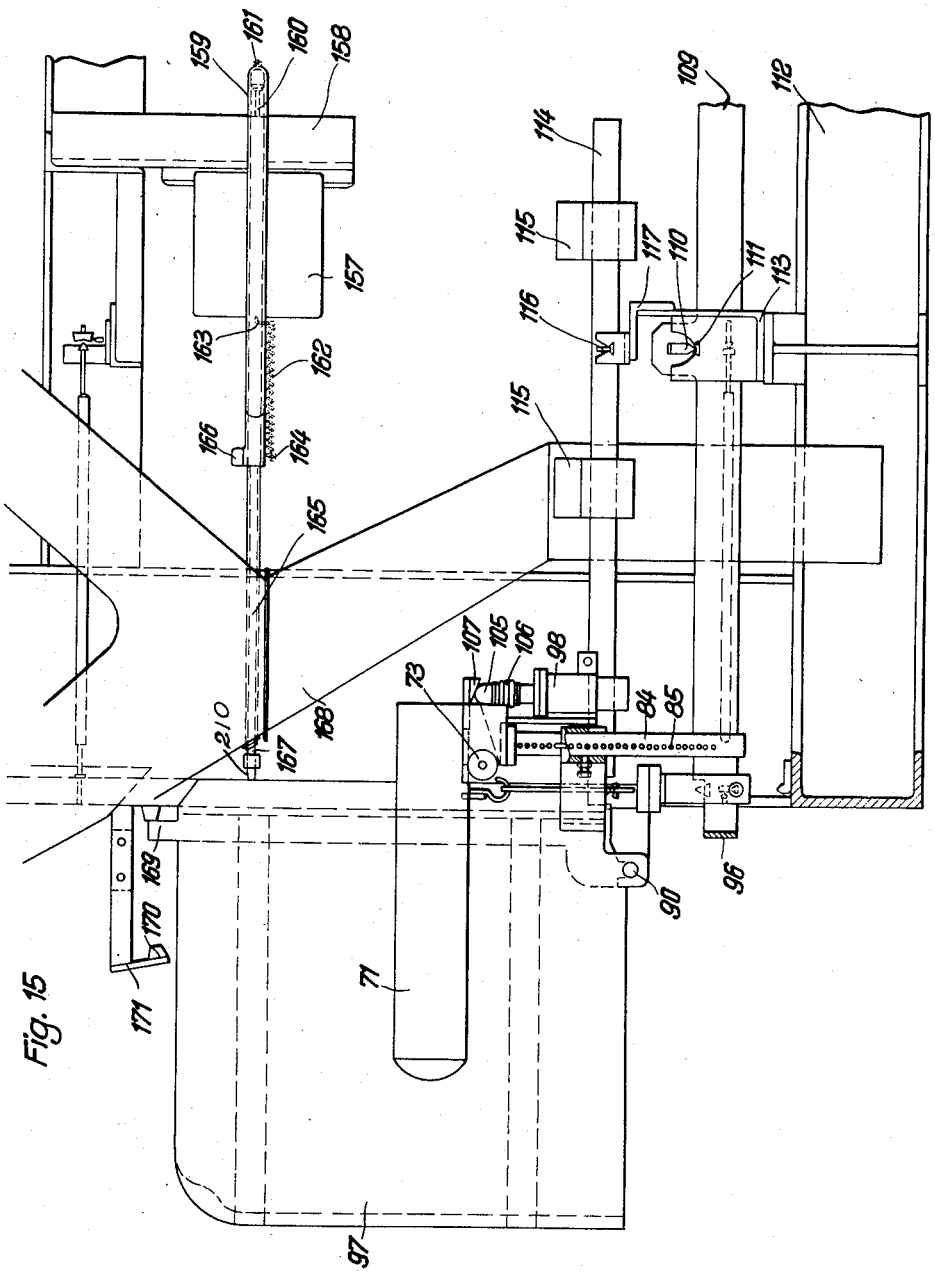

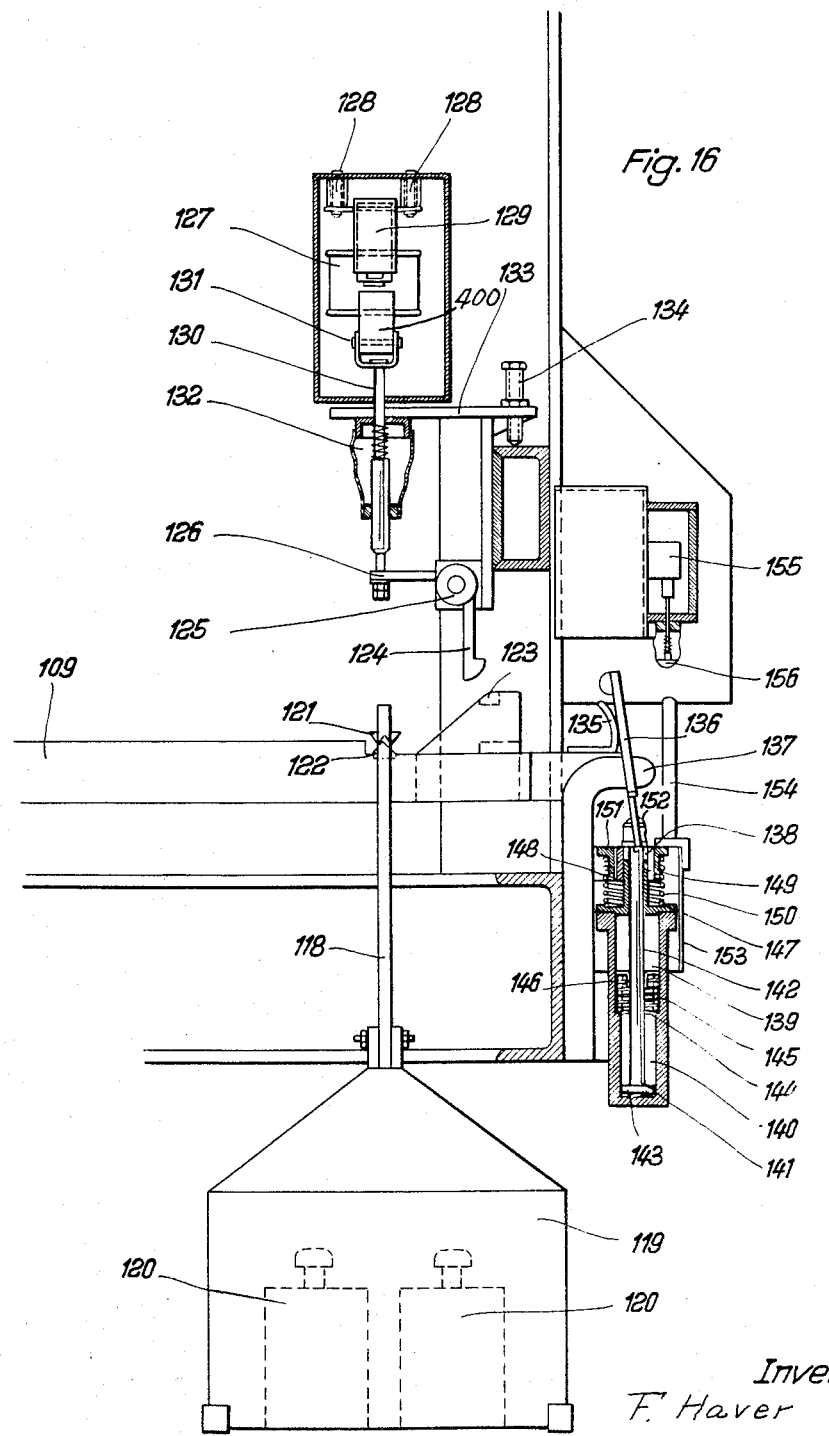

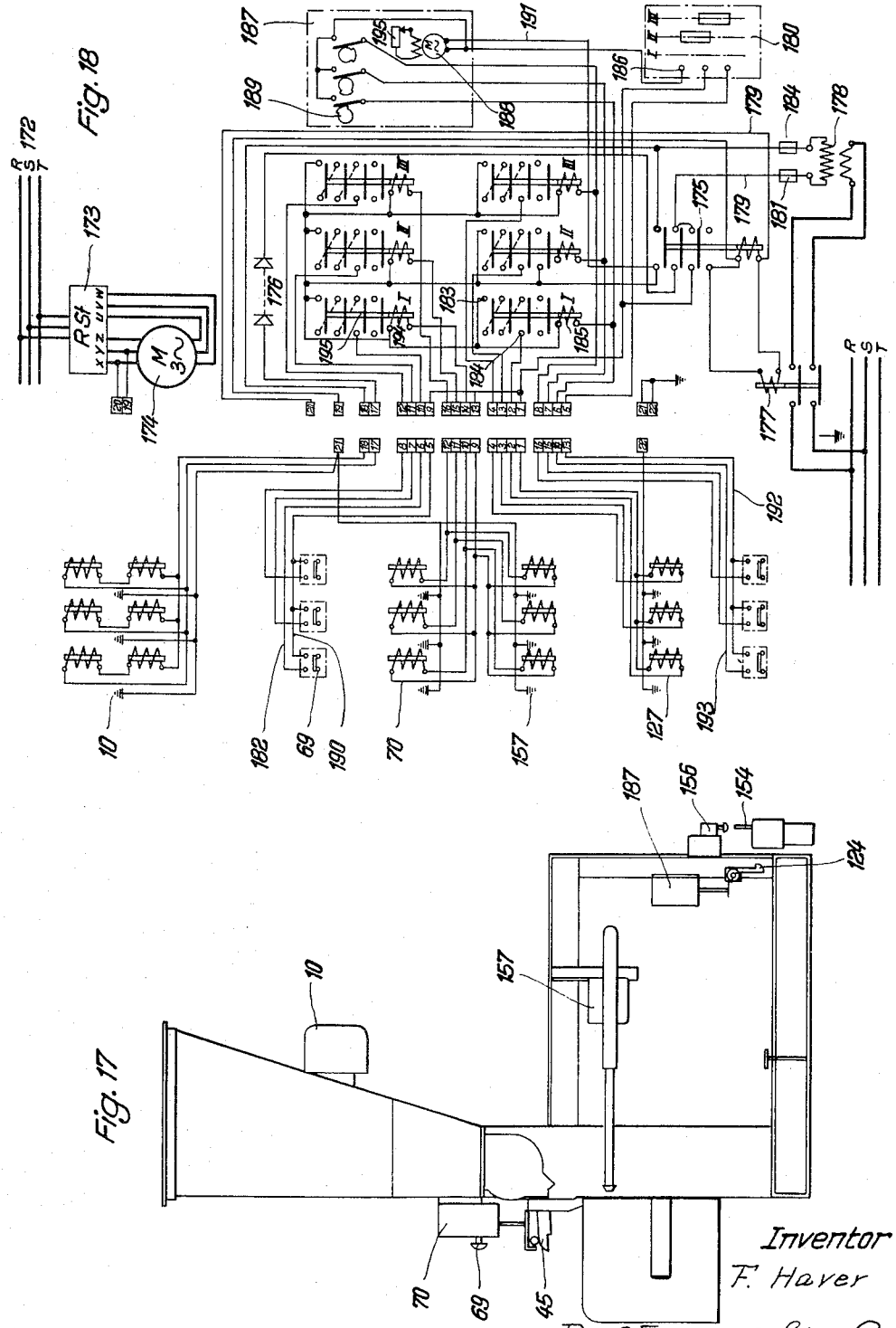

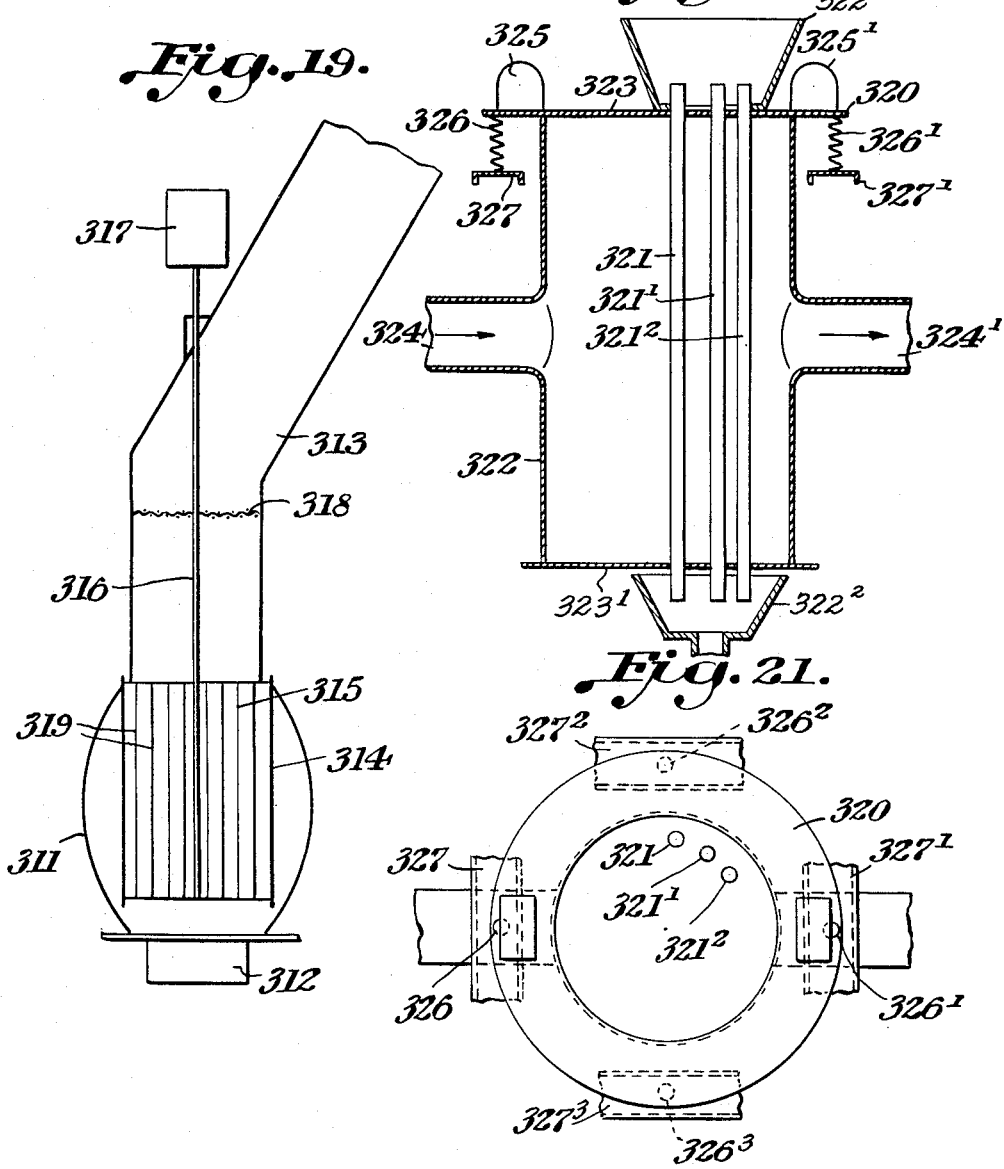

United States Patent Office 2,939,494
Patented June 7, 1960

2,939,494

METHOD OF TREATING FILLING MATERIAL AND AN APPARATUS FOR CARRYING OUT THIS METHOD

Fritz Haver, Kleygarten 8, Oelde, Westphalia, Germany

Filed July 30, 1954, Ser. No. 446,922

Claims priority, application Germany Sept. 27, 1950

30 Claims. (Cl. 141—1)

This application is a continuation-in-part of Serial No. 229,011 filed May 31, 1951 and now abandoned.

This invention relates to a valve bag packing machine for packaging cement, flour, corn flour and similar products wherein the bag is filled with the product to a predetermined weight and thereafter automatically removed from the machine.

An object of the invention is a provide a packaging machine wherein the product is preliminarily compressed in order to remove air pockets therefrom before the product is poured into the bag thereby making such product completely compact and without any danger of subsequent loosening thereof.

A further object is to compress the product being packed by removing therefrom any air which may have become intermingled with the product due to pneumatic feeding thereof or for any other reason before being poured into the bag so that the packed product will occupy a minimum volume.

Granular floury loose materials occupy a larger volume than necessary on being filled into containers, casks or sacks since they are highly permeated with air on being transported. This occluded air escapes slowly from the filling material which accordingly has a low apparent density. This disadvantage is particularly so in the case of filling valve sacks which have only a small filling aperture through which the filling material is fed to the interior. Since the filling operation frequently takes only a few seconds the air can not escape from the sack at the same time. In order to remedy this disadvantage the container has been subjected to vibration and the sacks have been swung to and fro. It is a further purpose of the invention to overcome the above disadvantages by dividing the material being fed into individual streams which are individually compressed by mechanical vibration and are then reunited after their compression or compacting before being fed to the sacks.

The pretreatment zone, in which the compression of the material takes place, has a depth and shape which conform to the peculiarity of the material and consists of a casing, through which pass circular or angular tubes or honeycomb passages and which is given from the outside mechanical vibrations of a high frequency by, for example, electromagnetic, compressed-air or unbalancing devices or the like. The filling material which runs through the casing is divided into as many small streams as possible which are vibrated, by the numerous walls of the casing, up to their cores. In this way, the particles of the filling material are assembled closely with displacement of the air particles lying between them.

The too bulky loose material, which runs into the top inlet part of the vibrating casing, gives up its air and thus loses a considerable part of its volume and therefore has a corresponding higher apparent density on leaving the casing. The stream of filling material issuing from the compression casing may now be seized by a centrifuging device and pressed into the empty sack. The rotation of this centrifuging device is made to conform to the altered volume. In order to obtain the most favorable speed, for this purpose, for the centrifuging device, an adjustable cone belt driving pulley is fitted on the motor or filling shaft.

An object of the invention is therefore a method by which the filling material can also be compressed in containers which, by their shape and size and also owing to the kind of filling method employed, do not allow any compression of the loose material in a treatment zone located in front of the filling device. A further feature of the invention accordingly consists in inserting the shaking device in the container and compressing the loose material in the container itself, i.e. in situ. In the case of flowing loose material, the shaking device is, at the same time, pulled out of the container, so that, after the termination of the shaking, the whole of the volume of the container is filled from bottom to top with compressed material.

According to the method of the invention, the compression of granular and floury material is also employed with great advantage in other operations in which the methods hitherto employed have given only a low efficiency, for example, in heating or in cooling granular or floury loose material.

For example, if cement at a temperature of 100° C. coming straight from the mill is cooled by the usual methods of cooling, by allowing the cement to run over metallic plates in a coat 10 mms. thick, the cooling action is exceedingly small since each particle of cement is surrounded by a layer of air which acts as a powerful insulator and prevents the effect resulting from the cooled metallic plates from reaching the surface of the material being cooled or the interior of the grain.

The surprising observation has now been made that, by driving off the insulating layer of air lying between the individual grains and by the compression of the mass which consequently takes place, an active exchange of temperature takes place to the outside, so that, on conducting the heat away, a rapid cooling takes place and, on supplying heat, a rapid heating of the whole of the compressed mass takes place. Accordingly, a further feature of the invention is that the loose material, which has been divided into partial masses, is during or after the compression, subjected to a temperature treatment.

Preferably, heat-conducting surfaces are employed over which the loose material is passed for the purpose of being heated or cooled and which are vibrated by shaking devices in order to drive away the air existing between the individual particles of material and to compress the loose material. Preferably, the side of the surface which is turned away from the loose material is suitably heated or cooled for the purpose of altering the temperature of the loose material. For the purpose of obtaining a rapid alteration of the temperature, the loose material is divided into separate streams which are as small as possible and may also, naturally, be subjected to a precompression before it is introduced into the actual treatment chambers in which the heat exchange is started and carried out by an external agent which has a high difference of temperature.

A further object is to provide a construction whereby a completely compactly filled bag or sack is obtained thereby resulting, as compared with an incompletely filled bag or sack having the same weight, in a substantial saving in the material from which the bag or sack may be manufactured and also rendering the bag or sack less liable to wear and tear.

A further object is to provide means whereby as the bag or sack approaches its predetermined weight the feeding of the product thereto is diminished so that sufficient time is allowed in which any overpressure of the product may be dissipated from the interior of the bag or sack.

A further object of the invention is to provide a construction wherein the filled sack or bag is discharged from the machine in such a way that the reinforced bottom thereof may strike a conveyor belt for leading the bag or sack away from such machine.

A further object is to provide a construction wherein after the bag or sack has attained its predetermined weight an automatic control comes into operation to discharge the bag or sack from the machine.

An additional object of the invention is to provide a construction wherein electrical control means are provided which can be timed either manually or automatically for carrying out the various operations of feeding, weighing and discharging the bags or sacks.

With the above and other objects in view which will become apparent from the detailed description below some preferred embodiments of the invention are shown in the drawings in which:

Fig. 2 is a front elevational view with parts broken away of the machine shown in Fig. 1.

Fig. 3 is an enlarged cross-sectional view of the upper portion of the machine slightly modified particularly showing the filming and compressing means.

Fig. 4 is a side view of another embodiment of the compressing means.

Fig. 5 is a top view of the compressing means shown in Fig. 4.

Fig. 6 is a top plan view of a third embodiment of the compressing means.

Fig. 7 is a top plan view illustrating a fourth embodiment of the compressing means.

Fig. 8 is a top plan view of a fifth embodiment of such compressing means.

Fig. 9 is a cross-sectional view taken on the section line A—B of Fig. 10 illustrating a sixth embodiment of the compressing means.

Fig. 10 is a side view of the compressing means shown in Fig. 9.

Fig. 11 is a top plan view of the modification shown in Fig. 9.

Figure 12 is a side view of the upper portion of the machine with parts shown in cross-section.

Fig. 13 is an enlarged side view with parts shown in cross-section of the saddle for the bag or sack and the oil damper therefor.

Fig. 14 is a front elevational view of the elements shown in Fig. 13 with parts shown in cross-section.

Fig. 15 is a partial side view of the lower front portion of the machine.

Fig. 16 is a cross-sectional view with parts in elevation of the rear end of the machine illustrating particularly the parts which cooperate with the rear end of the balance beam.

Fig. 17 is a general overall side view illustrating particularly the various switching devices.

Fig. 18 is a diagrammatic view of the electrical circuits for manually and automatically controlling the timing of the various operations of the machine.

Fig. 19 is a diagrammatic view of a compressing device wherein the contents of a cask are to be compressed or compacted.

Fig. 20 is a longitudinal sectional view through a device wherein the temperature of the material fed is altered while at the same time the material is precompressed or compacted in accordance with the invention, and Fig. 21 is a diagrammatic plan view with parts omitted of the device shown in Fig. 20.

In the various views similar reference characters indicate like parts.

Figure 1:
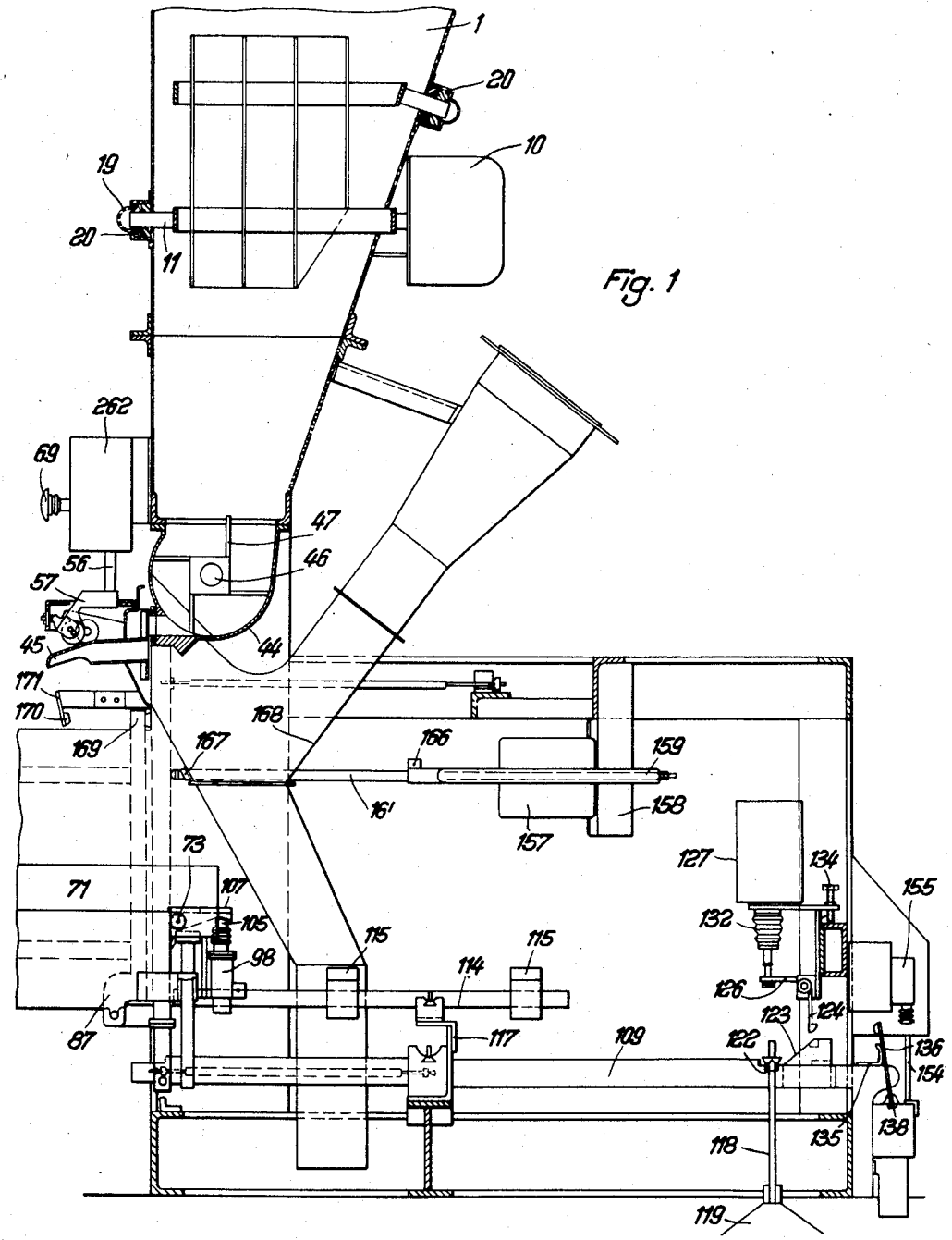
Fig. 1 is a side view with some parts shown in cross-section of one form of the invention.

The filling or bulk material to be packaged or packed coming from a container is directed by a special chute or the like to the hopper 1 of the packing machine as seen in Fig. 3. The filling of the hopper with the bulk material C takes place until the upper half of the gauge control indicated generally at D is reached when further filling is cut off. A cover 4 together with a packing ring 3 protects the container 2 of the control D from dust. A bar 7 extends into a bore in the bottom 6 of the container 2 and is secured at one end to a rubber membrane 5 which is clamped between the bottom of the container 2 and the wall 202 of the hopper. The other end of the bar 7 actuates a relay 8. Also a weight 9 acts upon this end to adjust the rubber membrane 5 to the cambered position at the interior as shown in Fig. 3.

When the filling material contacts the convex side of the membrane 5, the membrane 5 and the bar 7 are moved towards the exterior of the hopper and such movement actuates relay 8 which closes a circuit controlling means of any desired type which interrupt the conveyance or feeding of material to hopper 1. This interruption can be indicated visually by a control light and/or audibly by a horn.

The filling material to be packaged generally flows in loose condition and with a certain degree of aeration into the hopper 1. In order to obtain within the smallest volume the greatest weight of material, such material has to be compressed or compacted. For this purpose, the material is vibrated by a magnetic vibrator 10 fixed to the hopper 1 of the machine.

The shaft 11 of a honeycomb type of construction indicated generally at E extends into the magnetic vibrator 10 and is secured at such end to a support 12. Spaced plates 200 are mounted upon the shaft 11. The spring plates 13 and 14 serve as limits for the pressure springs 15. A middle spring plate 16 is connected firmly to the support 12. The spring plates 16 are arranged upon a threaded shaft 17 which by means of the nut 18 can be adjusted so as to adjust the spring tension. The magnetic vibrations which take place are reinforced by the springs 15 and are then submitted to the shaft 11 secured to the support 12. At its other end the shaft 11 is mounted in a rubber bearing 19 whose rubber rings 20 are held firmly about the end of the shaft by the cap 21. The rubber rings 20 due to their elasticity also promote the vibrations of the honeycomb E. In addition such rings prevent any undesired noise.

Above the shaft 11 is a second shaft 11' to which are secured also the spaced plates 200 and the shaft 11' at its right hand end as seen in Fig. 3 is mounted in the rubber bearing 19' comprising rubber rings 20' which are held firmly in place by means of the lid or cover 21'.

The stream of material flowing into hopper 1 is separated by the partition walls 200 and the vibrations affect the individual streams. Thereby, each stream of material is itself vibrated. On account of the subdivision, the vibrating power tends to always affect each individual particle so that each particle endeavors to come into contact as quickly and closely as possible with a neighboring particle and to eliminate any existing hollow spaces as far as possible. The air released thereby escapes upwardly.

In the settling or compressing chamber 203 according to Fig. 4 the vibrations are transmitted by means of shafts 22, 23 and 220 via bars 28 and 29 to honeycomb chamber 203 which divides the material by the walls 24 and 25 into streams. During the flow of the material the chamber is subjected to vigorous vibrations transverse to the direction of flow of the material.

The compressing or compacting chamber can be constructed in different ways. According to the embodiment of Fig. 3 the stream of material is separated by simple chamber walls 200. According to the embodiment of Figs. 4 and 5 the different streams of material are separated from each other in such a way that the shaking or vibrating power is effective diagonally.

In the embodiments of Figs. 6 and 7 the chambers are formed as squares or rectangles and the vibratory power is effective transversely to the walls 26, 27 and 28.

According to the embodiment of Fig. 8 the tubes 30 are used as separating and vibratory conduits.

Figs. 9, 10 and 11 show a honeycombed chamber 204 of a special form. Several box-like ribs 31 having closed bottoms 205 and caps 32 are provided at the sides with perforated sheets 33 covered with a thin screen 34. These ribs 31 are secured to the pipes 35 and spaced from one another by the spacing sleeves 36. The shafts 37 and 38 serve for mounting the chamber for vibration in the machine. A connecting plate 40 holds the lower pipes together. Furthermore side walls 41 are provided for securing the ribs. By means of the vibratory device acting upon a shaft 38 the chamber is vibrated. The air released escaping from the filling material penetrates through the thin screen 34 and the holes 206 in the sheets 33 of the box-like ribs 31, flows through holes 42 provided in the pipes 35, passes through pipes 43 and enters the rubber bearing casings 19 on which no lids 21 are provided and from there dissipates into the atmosphere.

The compression or compacting cells according to Figs. 6 and 7 are mainly used for products, the bulk weight of which is close to a specific gravity of 1 or higher.

The compression cells according to Figs. 4, 5 and 8 are provided for light-weight products of about 0.5–0.9 specific gravity, while the hollow chambers according to Figs. 9, 10 and 11 are used for very light products with a specific gravity of 0.5 and below. It has been proved that the portion of air in mechanically filled bulk products increases in inverse ratio to the specific weight. If necessary, a chamber according to Fig. 5 or 8 also can be used for heavy bulk products when the bulk products are fed pneumatically and intermingled with air during such feeding.

The material precompressed and compacted by the honeycomb chamber falls to the dispensing chamber 44 (Fig. 3) provided at the lower end of hopper 1. For each filling unit a chamber 44 is provided and in the form of machine shown in Figs. 1 and 2, two dispensing chambers are provided. The dispensing chamber feeds material to the charging spouts 45 (Figs. 1 and 3). Within the dispensing chamber 44 a driving shaft 46 rotates with its shovels or filling knives 47. The drive of the shaft 46 is accomplished by a motor via a driving pulley 48 (Fig. 2) secured to shaft 46.

The shaft 46 is supported in bearings 49 (Fig. 2), which are mounted on brackets 51 fastened to the side walls 50. The filling shaft 46 rotates during the charging time of the machine.

The filling knives or shovels 47 (Figs. 1 and 3) seize the material and sling it during the filling time through the valve ring 53 which is fastened to the mouthpiece 52 and is provided with a steel plate 54 not subject to easy wear into the movable filling pipe plate 55 provided before the mouthpiece. Filling pipe plate 55 is also provided with a plate formed of durable material. The material flows through the filling spout 45 into the suspended valve sack (not shown).

For holding the empty valve sack on the filling spout 45 a sack holder 56 is used. On a fork 57 and secured by a hexagon screw nut 58 are provided two rubber rolls 59 and 60. The sack holding rolls can accomplish together with the sack holder 56 a vertical movement.

Fig. 12 shows the sack holding magnet casing 262 in cross-sectional view. The sack holder 56 is connected directly with the core of the magnet 265 in casing 262. A guiding flange 61 is protected by a sleeve 62 against the penetration of dust or foreign substances and is fastened to a bottom plate 63. The guiding flange leads the connecting bar 64 in its bore to the magnet core 65. The magnet 265 is actuated by a controlled circuit to draw the magnet core into its magnetic field. The sack holder connected therewith is raised thereby so that a valve sack can be suspended to a filling spout. As described below, this operation may be accomplished either automatically or manually.

For manual operation a switch 66 is used. The actuating bar 67 thereof is covered with a sleeve 68. By pressing the switch button 69 a circuit is closed at 70 for the hand control of the sack holder, but which operates only when the automatic control of the machine is switched off. The removal of the filled sack can be accomplished also by hand or automatically. An empty valve sack or bag suspended from the filling spout 45 is held fast after actuation of the sack holder magnet 265.

The sack rests with its bottom on two saddle pipes 71 whose spacing is adjustable. Saddle pipes 71 and the saddle foot 72 (Figs. 13 and 14) at the rear thereof always accomplish similar movements. Saddle foot 72 is mounted rotatably at the turnable joint 73. Fig. 14 shows this turnable joint 73 in cross-section. Two plates 74 are connected fixedly to the saddle pipes 71. By means of a connecting bar 75 which is screwed laterally to caps 76 or is pinned to the same, the saddle foot 72 is rotatably mounted. A return spring 77 engages at one end with a bore 78 of the joint part 79 and is kept rigid in the saddle turning point, while the other end of the spring 77 engages a bore 80 of the joint part 81 and is connected with the fixed frame part 82.

By tilting the saddle foot 72 into the dotted line position shown in Fig. 13, the spring 77 is tensioned.

The saddle foot 72 is supported by two columns 84 on a balance beam. Since various sizes of sacks are used, a row of bores 85 is provided in each column 84, in which according to the desired height a pin 86 (Fig. 13) can be inserted. This pin is supported by the beam 87. Each column and the beam (Fig. 14) are connected together by screws 88. The connecting beam 87 has forwardly extending ears mounted in bearings 89 of the connecting bar 91 by means of a bolt 90. By means of this bearing the whole saddle 71, 72 can be tilted towards the front.

The connecting bar 91 is provided on each side with a fork 92 which is supported by knife-edges 95 of a balance pendant 94, which rests on knife-edges 93 at the front part of the balance beam 96. By means of these wedge-shaped edges the balance beam is not connected tightly to the saddle, so that the whole saddle with the filling spout and the sack stool connected thereto can accomplish a vertical movement.

As the weight in the sack increases, the saddle lowers together with the filling spout 45 in front of the mouth piece 52 of the dispensing chamber 44. The cross section of the communicating channel between the mouth piece 52 and the filling spouts 45 (Fig. 3) decreases and accordingly the feed of material decreases so that during the last stage of the filling operation only small quantities of material are supplied until the exact and final weight is obtained.

Laterally of the saddles 71 (Fig. 15) special guiding plates 97 are provided. These guiding plates lead the sack after it tilts away from the filling spout into the desired gliding-off direction, so that the detached sack always falls downwardly with its reinforced bottom in advance. During the filling time a part of the sack weight is carried by the filling spout 45. If the sack is tilted away from the filling spout 45 by means of a device which will be described below—after detaching the sack holder—so that its weight acts upon the free ends of the saddle pipes 71, then the spring 77 cannot support the saddle any more and the saddle pipes 71 tilt around their turning joint 73 towards the front. The sack then falls from the bottom of the plates 97.

After this throwing off the saddle 71 returns to its horizontal position under the influence of the spring 77. The saddle return spring can be adjusted according to the weight to be handled. An oil brake receives the returning saddle and diminishes the impact. This oil brake is provided with a cylinder 98 connected to a fixed part of the frame. In the cylinder 98 there is a piston 99 having a piston rod 100. In the lower end of the piston 99 a bore 108 is provided which extends at first axially and then radially. This bore 108 interconnects the space above and below the piston 99.

A disc 101 rests on a shoulder provided upon the cylinder wall. On this disc is supported a pressure spring 102 which bears at its other end upon a disc 103 fastened to the piston rod 100. The disc 103 moves with the piston upwardly and downwardly while the disc 101 remains on the shoulder of the cylinder wall. A lid 104 closes the cylinder. The piston rod is guided during its movement in a bore provided in the lid 104. Above the piston rod 100 is provided a cone-shaped steel head 105. By means of the rubber collar 106 the steel head 105 and the lid 104 are connected together. The collar protects the oil brake from dirt and foreign substances.

If the extension 107 fastened to the rear end of the saddle is raised upon tilting the saddle around the saddle turning joint 73, the head 105 with the piston rod 100 also slides upwardly due to the pressure of the spring 102. The oil present above the piston now can flow back via the bore 108 to the lower space. If the saddle, tilted by the sack weight and being in dotted position 83, snaps back after its discharge by means of the pressure spring 77 into the original saddle position, then extension 107 contacts head 105. The piston 99 urged by the piston rod 100 fastened to the head 105 compresses the oil below the piston. Oil then flows through bore 108 into the space above the piston. This construction cushions and dampens the thrust of the saddle.

The balance beam 109 (Fig. 15) controls the predetermined weight and the balance action. The knife edge 110 of the balance beam is supported upon the plate 111 which is connected with the frame 112 by means of a bracket 113. The final flow regulator 114 which accomplishes the exact weighing of the amount to be filled is connected to the balance beam only indirectly and is provided with weights 115 which can be adjusted on a scale according to the desired filling weight. The knife edges 116 of the final flow regulator rest on a bearing plate fastened to the angle plate 117 which in turn is secured to the bracket 113. From balance beam 109 (Fig. 16) by means of a connecting bar 118 is suspended a weight box 119 with the weights 120. Bearing plate 121 secured to the connecting bar 118 is suspended with the weighing box on the knife edge 122 upon the balance beam 109.

On the balance beam 109 there is secured a latch plate 123 which after the filling weight has been obtained secures the balance beam by means of the latch 124. The latch 124 is a double armed lever rotatable on pivot 125 and the arm 126 thereof is controlled by a latch holder magnet 127. The latch holder magnet 127 is mounted upon the frame of the machine. The latch holder magnet 127 is held by the spacing rolls 128 and the member 129 secured thereto and draws a core 400 within the magnetic field. A rod 130 is connected with the core by means of the pivot 131. When the magnet is energized the core and the rod 130 raise the arm 126. The downwardly directed latch lever 124 is oscillated and releases balance beam 109 for the next weighing.

The rod 130 is covered by a shield 132 secured to the magnet housing, and such housing is connected to the frame by a connecting bar 133 which can be adjusted by means of a screw 134.

The cam 135 located at the end of the balance beam 109 upon raising the rear end of the balance beam 109 presses the holding rod 136 to the side about a pivot 138 upon the oil brake 139 from the holding part 137 upon the frame for the oil brake 139. Upon turning the holding rod 136 so as to be released from part 137 the oil brake 139 connected to the frame is freed. In a cylinder 140 slides piston 141 with the piston rod 142. In the lower end of the piston a bore 143 is provided extending in axial and radial direction. This bore provides the connection for the space above and below the piston.

A disk 144 rests on a shoulder provided in the cylinder wall. On this disc is supported a pressure spring 145 whose upper end contacts a disc 146 secured on the piston rod. The disc 146 moves upwardly and downwardly with the piston while the disc 144 remains on the shoulder of the cylinder wall. The cylinder is closed by a cover 147. On a cylindrical extension of the cover 147 a sleeve 148 slides which is axially removable. This possibility of movement is limited by a long slot in the sleeve 148 into which a pin 149 is inserted and by the extension of the cover 147 in which the pin is also held. Pressure spring 150 is supported on cover 147. The pressure effect of the spring is regulated by an adjusting nut 151. The adjusting nut can be screwed higher or lower on the sleeve 148. The adjusting nut 151 has a special purpose which will be explained below. On account of the overweight of the balance beam 109 carrying the weights 120 the balance beam lowers suddenly when relieved of weight. The resulting hard thrust is transmitted by the steel knob 152 to the piston 141. The piston presses the oil through the bore 143 into the space above the piston. Since the oil can only displace slowly, this construction has a damping effect.

The filling spout 45 (Fig. 3) is now exactly positioned in front of the filling mouthpiece 52.

The predetermined weight is not yet reached, since the spring 150, being under a pressure of 2 kg. presses piston 141 with a limited raising towards the top and thereby before reaching the predetermined weight raises the weighted side of the balance beam for about ⅓ of the balance play. Between filling spout and the orifice of the mouth piece there is therefore a retention for the remainder to be filled. After reaching the predetermined weight, the weighted side lowers until complete settlement. At this moment the rammer 154 is released for the actuation of the final position switch 155 by the release cam 135 which turns and draws away the holding rod 136 about the pivot 138 from the holding part 137. Rammer 154 presses on the actuation knob 156 of the final position switch.

In the final position switch 155 contact pieces are pressed to a contact bridge and thereby the circuit for the actuation of the hand switch and sack discharging magnet is closed. The final position switch is connected to the frame.

Fig. 15 shows the sack discharging magnet. The sack discharging magnet which is enclosed by a casing 157 is connected to the frame by a bar 158. A fork-like bent pipe or discharge fork 159 encloses the casing of the magnet. This discharge fork 159 is fastened at the middle of the right half of the fork 159 to a connecting rod 160 which leads to the core of the electromagnet in the casing 157 and transmits the movement of the core to the fork 159.

Nuts 161 provide for an adjusting of the connecting rod in the longitudinal direction of the fork. A draw spring 162 is connected at 163 with the magnet casing and at 164 with the fork. The spring draws the core after actuation of the magnet out of the magnetic field.

The sack discharging bar 165 is held by means of a clamping device 166 to the fork 159 and is led through the exhaust pipe 168 by a conducting bearing 167.

The exhaust pipe 168 is only provided for the exhaust of dust for keeping the machine clean.

If a circuit is closed for the magnet 157 by the final position switch 155, the fork connected to the core is urged in the direction of the tilting frame 169. The rubber buffer 210 pushes the sack released by the sack holder magnet 56 (Fig. 3) from filling spout 45 and at the same time tilts the tilting frame with the guiding plates 97 (Fig. 15) around its pivot 90 towards the front until it reaches contact 171. The contact 171 receives the tilting frame 169 by means of the rubber buffer 170. The frame tilted this way displaces the center of gravity of the sack and drops the sack. After that the tilting frame 169 is returned to its original position by the spring 77.

Then the machine is ready for the next filling operation.

When using manual or automatic timing, the electrical control operates as follows:

The switch board (Fig. 18) is connected to the various switches and magnets indicated generally in the machine (Fig. 17) by the circuits shown.

The electrical distributing mains 172 with three phases RST leads to the connecting terminals of the three phase switch 173. In one position of the switch the current runs to the connecting terminals $u, v, w$ thereof for connection with the electromotor M. The three alternating currents RST are connected together in such a way that for this line the voltage is reduced 1.73 times. The electromotor 174 through appropriate means drives the pulley 48 and shaft 46 (Figs. 2 and 3). A short time thereafter the switch is manually operated thereby connecting the terminals $x, y, z$ directly to the network and the motor receives the full network voltage.

Lines "19", "20" from terminals $x, y$ receive first tension from the three phase switch of the motor. These lines are connected with the terminals "19" to "20" of the electrical control circuit. Terminals "19" and "20" are connected to the relay 175 for the rectifier 176 and from there to main relay 177. Relay 177 controls a circuit from the main line RST to the transformer 178.

The transformed current 179 leads via fuses to the vibrating magnet 10 and from there via terminals "17" and "21" back to the switch board. From terminal "17" the circuit extends to rectifier 176 and from there to relay 175. The circuit is thereby connected to the network by terminal "17".

If the selection switch 180 for manual and automatic timing is placed at position III, the machine is ready for operation after connecting the terminals "1"–"22" of the switchboard with the corresponding terminals "1"–"22" of the machine shown at the left of Fig. 18.

The control circuit described is the same for all three filling units of the machine.

The current for the manual switch 69 runs from the transformer 178 via fuse 181 to relay 175 and then to the selection switch 180. According to the setting thereof the current runs to switch 69.

When the operator of the machine slides an empty valve sack on to the filling spout 45, after actuation of the manual switch 69 the current runs via conductor 182 to the terminal of the coil of the relay 185. Since the other terminal of the coil (with a shunt to the connection 183) is connected via fuse 184 with transformer 178, the switch 69 thereby closes a circuit to the relay 185. Relay 185 is actuated. Current now flows from connection 183 via fuse 184 and terminal "2" to the latch holder magnet 127, which now attracts the latch lever 124 and thereby releases the balance 109 for the filling position. The other end of the magnetic coil 127 is connected via terminal "1" with relay 175 and transformer 178. The circuit is closed thereby.

For automatically timed operation the electrical control operates as follows:

If the selection switch 180 is switched from position III to position II, the current runs from the connection 186 to the clock switch 187 and further to the contacts of the clock. The control cam 189 rotated by the motor 188 closes at a certain position the circuit for relay 185. The rotation of the motor is influenced by the potentiometer 195. The further operation is the same for the automatic operation as for the manual operation.

The connector 191 leads via relay 175 and fuse 184 to the transformer 178.

After the weighing of the sack by means of the balance 109 (Fig. 15) the balance beam lowers and frees the piston 141 (Fig. 16) of the oil brake. The piston 141 is urged upwardly by spring power and pushes the rammer 154 against the actuation knob of the final position switch 155, the circuit of which is closed through conductor 192 via terminal "13", relay 175, fuse 181, transformer 178, conductor 193 and terminal "14" to a terminal of coil 194. The other terminal of the coil extends via relay 175 and fuse 181 to the transformer 178. The circuit thereby closed actuates the relay 195.

To the terminal of relay 195 is secured the conductor, which extends from the transformer via fuse 184, relay 175, a switch bridge connection, and terminal "10" to the beginning of the coil of the sack holder switch 70 and the sack discharging magnet 157 (Fig. 15). The two other leads to the sack holder switch and sack discharge magnet extend via terminal "9", relay 175 and fuse 181 to the tansformer 178. Thereby the circuit for these two magnets is closed as well. Accordingly, the switching operation in the machine and in the electrical installation is completed. This operation is the same for each filling.

The following description of the operation of the valve sack packing machine is based on a three-spout machine (Figs. 1 and 2), the middle spout of which has been omitted. The material to be filled is supplied to hopper 1, passes the precompressing or compacting honeycomb according to Fig. 4, falls into the dispensing chamber 44 and from there through filling spout 45 into the valve sack. The sack rests with its bottom on the saddle 71 and is positioned within the guiding plates 97. Sack and sack holder are carried by the balance beam 109.

When the balance is in filling position, filling nozzle or spout 45 is in front of the orifice 52, 53, 54 of the dispensing chamber. When the predetermined weight is reached, the balance beam lowers at the front and also the filling spout to the position shown in Fig. 3.

When operating the machine manually, the automatic timing device is switched off. The operator operates in the following way:

The three filling nozzles or spouts are in shut off position as in Fig. 3, i.e. the rear end of the balance beam 109 is at its top position. To every nozzle an empty valve sack is fitted. The main drive motor 174 is switched on and the filling shaft 46 and shovels 47 rotate. Now the operator pushes the switch knob 69 inwardly (Fig. 12). Through actuation of the switch knob 69 relay 185 controlling the latch lever 124 is actuated. The circuit for the latch lever magnet 127 is closed. This oscillates the latch lever 124 whose nose is displaced towards the left (Fig. 16), so that the latch bolt 123 is freed and the rear part of the balance beam 109 lowers on account of the overweight. The thrust thereof is damped by the brake 139. At the same time the circuit is opened to the magnet 65 via relay 194, so that bar 56 may drop and the rubber rolls 59 and 60 hold the sack. When the filling is accomplished, the balance and the sack stool drop at the front and the balance beam 109 is lifted at the rear. Latch lever 124 snaps into latch bolt 123. The cam 135 slides the supporting part 136 laterally and thereby releases rammer 154. Rammer 154 moves slowly towards the top, presses knob 156 of the final position switch 155 and closes the circuit of the magnet 65 (Fig. 12) via relay 175, and at the same time to the sack discharge magnet 157 (Fig. 15) which by means of the sack discharge bar 165 tilts the whole sack stool towards the front. After the sack is released from filling spout 45, it can drop vertically. A new empty sack is fitted and the knob 69 actuated again. This operation is accomplished at the left, middle and right filling nozzles or spouts.

The automatical timing operation of the machine takes place as follows:

All three nozzles are in shut off position. The empty sacks are fitted, the motor for the filling shaft 46 is switched on and also the timing clock 187 via the selection switch 180. The clock 187 according to predetermined timing releases one nozzle after the other in the following way: via latch holder relay 185 the latch holder magnet 127 is energized and the latch bolt 123 is released, so that the balance beam 109 drops at the rear and the filling spout 45 rises into filling position. Simultaneously the circuit is opened to magnet 65 via the sack holder relay, so that the sack holder 56 lowers and the rubber discs 59 and 60 rest on the valve sack. Filling then takes place. The same operation is followed according to predetermined time intervals by the middle and right nozzles. After reaching the sack weight, the operation is the same as for manual operation, i.e. the sack holder magnet 65 is energized and the sack is released for tilting away, the sack pusher pushes the sack and the tilting frame 169 towards the front and the sack falls.

The above described method and apparatus is of particular interest in the cement industry although not restricted thereto.

When delivering cement into silos or hoppers by means of worm conveyors, elevator and similar apparatus there is always a degree of aeration which affects and increases the volume. This applies particularly and seriously when cement is handled by pneumatic conveyors.

It is necessary therefore to allow time for at least part of the entrained air to escape from the cement before filling into sacks.

When the use of valve bags was introduced, difficulties of a serious nature were experienced. The importance of the porosity of the paper used for cement sacks had not then been appreciated. It was proved very soon, however, that it was possible to fill a sack within remarkably short periods provided that the air swept forward by the charging impeller and entrained in the cement could escape with reasonable speed through the pores of the paper.

Nevertheless, even today, this problem has never been completely solved as may be seen on any cement sack immediately after filling on a valve bag packing machine. A good deal of air remains trapped in the bag, escaping gradually when stored and finally showing the sack larger than the contents actually require.

It became the practice even to fill fully aerated cement into valve bags because other advantages inherent in the use of valve bag packing machines were held more important than the possible saving of paper which might have been obtained with mechanical bag filling.

The cost of paper bags is nevertheless a large item in the cost sheet of cement. There is a strong tendency to reduce the strength and numbers of ply of cement sacks.

Many attempts have been made to allow the use of smaller or thinner sacks. Bags which had been or were being filled were beaten, rocked or vibrated and various other ideas and proposals were investigated. But all these methods proved unsatisfactory insofar as actual results are concerned. This type of manipulation requires more time than is available with fast valve bag packers. It takes half a minute to achieve any effect on a full 112 lbs. sacks.

The reason is fairly simple. A freshly filled valve bag feels like a blown-up rubber ball. The contents consist in fact of a cement-air mixture which floats—as it were—inside the sack. If such a sack is laid flat, it will take about 20-30 seconds until the excess air has percolated through the paper or through the valve of the bag. Beating, rocking or vibrating will be quite useless during the first 10 seconds of this period because shocks or vibrations cannot penetrate the liquid mass but are swallowed up by its elasticity.

Attempts to vibrate the cement before filling into sacks were made only by external vibration of the silo or hopper with the object of ensuring a steady flow. Compacting could not be achieved in this manner.

The above described method and apparatus has made it possible to fill compressed cement directly from the packing machine into the valve bags in such a way that the bags are filled solid and subsequent loosening is ruled out.

The principles used are very interesting. Since experience had shown that it is not feasible to compact, quickly enough, any larger volume of fine cement, trials were made with relatively small quantities. Vigorous shaking of such smaller quantities sufficed to show remarkable promise. It was concluded that the volume of cement subjected to vibration, beating or rocking must be small enough to allow absorption by the whole of the material.

With the above described method this is achieved by dividing the cement into separate streams passing through a system of honeycomb cells, the latter being vigorously vibrated in such a way that the vibrating impulses pass laterally through the separate streams of cement. Vibration thus becomes effective over the whole flow section and compacting is achieved very quickly. Every particle of cement endeavours to make close contact with its neighbors, cavities are rapidly filled, the whole process resulting in the formation of an almost solid mass.

The compacting of the cement is so effective that it is difficult to eject through the charging tube by means of standard centrifuge equipment such as used with valve bag packing machines.

In order to secure the best possible results, it is necessary to synchronize and coordinate the pre-compacting vibration with the speed and velocity of the charging turbine impeller.

As a result of the above arrangement, shorter bags may be used to contain the same weight of cement and also the strength of the paper may be safely reduced. This results in a substantial saving in costs.

In various known machines, the sack, in dropping, turns forward through about 120° and comes to lie horizontally on the ground. The machine attendant must therefore either stay almost one metre away from the machine or, as is generally usual, sit in front of the machine. The result of operating the machine in seated position is that the reach of the hands from the same position cannot practically be exceeded, since revolving seats or seats which move backwards and forwards have a tiring effect on prolonged use.

With such a method of operation, the output is limited. Consequently, in order to render greater outputs possible, rotating packing machines have been employed, in which the operator stands in one place and fits the sacks on and the filling positions travel on in a circle, the filled sack being thrown off at the end. However, in this method it is necessary to work with very complicated connections which all tend to produce disturbances, especially with a large number of weighing devices, which may be as many as fourteen, each of which has, in many cases, to be adjusted daily.

In the invention, set forth above, after tilting away the sack from the filling spout the saddle may be swung out into a position in which the sack on the machine can drop immediately in an upright position.

By means of the invention the sack drops in an upright position, so that the attendant can work directly in front of the machine, closely adjacent the point where the sack is dropping.

While previous stationary valve-sack filling machines have been constructed with, at most, four filling positions, in the machine according to the invention, six or more filling positions can be attended to by one man. The latter must, since the machines are wider, be free to walk to and fro in order to attend to all the filling positions.

For the filling of a valve-sack in a packing machine, a definite, fixed time is required. On the other hand, the fitting of an empty sack on the filling spout and the actions performed for this purpose by the attendant require a definite standard time which the attendant is capable of maintaining and which can be ascertained by usual methods. According to the invention, these two factors are employed to determine the construction of the timing device, by means of which the present output per hour of usual machines for filling with cement and other bulk materials of about 1,000 hundredweight sacks per operator is considerably increased and improved.

The filling of cement and other bulk materials into these self-closing valve sacks according to the invention now proceeds at great speed and 50 kgs. of this filling material is frequently hurled into the sack in less than 8 seconds, which, for reasons of economy, is only as large as is necessary to receive the filling within it. At the instant at which the standard weight is reached, there is present, in the sack, a great excess of pressure which, however, will have abated in a few seconds. In this time, the material becomes stabilized and the excess of air escapes through the pores in the walls of the sack and sack-valve.

The excess of pressure present at the time when the filling is concluded has a disadvantageous effect, since, owing to the descent of the balance, the filling material is released, so that the filling material can again flow out of the sack easily and thus influence the exact weight. In addition, the sack which tilts away from the filling spout is frequently soiled by the issuing filling material.

These disadvantages should be obviated, since the purchaser requires a correct weight and also attaches great importance to clean packing. The defects are obviated if the sack remains at rest for a few seconds after it has been completely filled, so that the material with which the sack is filled can stabilize itself and the excess of air can escape. There must therefore be a delay between the terminated movement of the balance beam and the removal of the sack-holder, the sack-holder first remaining on the sack and then being removed by a controlling operation.

The violent rising of the balance weight, after removing the filled sack, is prevented by the damping device. When the sack is then lowered on being filled, the weight-end of the balance beam, beneath which the damping device is located, rises. However, the damping device does not follow as rapidly as the balance beam rises, but it follows with retardation.

This retardation is used for the purpose of releasing the sack-holder with a delay and, consequently, releasing the sack after the expiration of a few seconds.

The device may also be employed with advantage in many other cases, for example in casks, in small packages, for tabletting, briquetting, etc.

Any desired degree of compression can be obtained by regulating the speed of travel of the filling material, the length of the vibrating casing, the area of the honeycomb partitions and the frequency of vibration of the compression casing.

The degree of compression amounts to at least 5%, but can be brought up to a much greater percentage. Great savings are already produced with a minimum compression of 5%, i.e. with the reduction of the height of a sack from 100 cms. to 95 cms.

As shown in Fig. 19, in a further example of embodiment of the invention, the container 311 to be filled for example a cask, is put on a table 312 (which may, if required, be provided with a shaking device) beneath the down pipe of the filling device. Connected to the bottom end of the down pipe is a vertically displaceable telescopic pipe 314 which contains the compression device 315 which consists of a honeycombed partitioning that is shown in a few embodiments in Figs. 4 to 10 inclusive. The compressing device 315 and the partitioning means are connected by a rod 316 with the shaking device 317 which produces the vibrations. The telescopic pipe 314 is first stood above the cask and can be lowered to near the bottom of the cask.

In the filling operation, the already previously weighed material flows through the pipe 313 into the cask 311 and is dammed at about 318, since, as a matter of fact, the volume still amounts to double the capacity of the cask. The shaking devices now come into operation. The cask itself is shaken by the table 312 and the contents of the cask are shaken by the device 314. The whole of the contents of the cask is vibrated by the honeycomb partitioning 319, so that the material inside the cask is compressed in a few seconds owing to the escape of the air from between the particles. The telescopic pipe 314 is now pulled upwards slowly, together with the partitioning 319, on the rod 316, the level of the cement being lowered. The movements and the intervals of time at which they take place are attuned to one another in such a manner that the telescopic pipe, together with the compressing device consisting of the partitioning, leaves the cask when the level of the filling material is inside the cask. In this way, the whole container (in the present case the cask) is filled from the bottom to the top with compressed material.

Instead of casks, open sacks and large containers of a capacity of several tons can be filled with compressed material, it being possible to treat in this way all materials which can be compressed by shaking.

For the purpose of heating and cooling granular or floury loose material by means of the compression of the loose material in accordance with the invention, the device represented in Figs. 20 and 21 is particularly suitable.

Extending through a closed container 322 having end walls 323 and $323^1$ are pipes 321, $321^1$, $321^2$ etc., through which the material to be treated is passed. The cooling medium enters the container 322 at 324 and flows out at $324^1$ after flowing round the system of pipes. The wide flange 320 on the end face 323 rests on springs 326, $326^1$, $326^2$ and $326^3$ which are supported on the supporting frames 327, $327^1$, $327^2$ and $327^3$. The vibration-exciting devices 325 and $325^1$ vibrate the closed container 322 and thus compress the material flowing through the pipes. These vibrations also promote the passage of the compressed material through the pipes. An inlet funnel is indicated at $322^1$ and an outlet funnel at $322^2$.

By means of this compression, the air, which surrounds the individual particles and acts as an insulating layer, is expelled so that the exchange of heat between the individual particles proceeds very rapidly owing to the contact of the particles with one another and is also rapidly given up to the surrounding heat-conducting surfaces. The heat exchange is promoted still further by the division of the whole mass into separate partial streams. The cooling of the material is therefore effected in the shortest possible time. The time taken by the device may be attuned to the material and depends upon the initial temperature and the desired degree of cooling, the strength and the frequency of the vibrations as well as the length of the cooling aggregate being important factors.

The pipes 321 etc. may also extend above the casing 322 and be subject to shaking, so that the loose material flowing into the pipes is already compressed to a large extent when it enters the zone in which the admission into the casing 322 and the discharge therefrom of the cooling medium takes place, the shaking of the casing then resulting in a further compression and the final temperature exchange.

The same operation is naturally employed for heating granular or floury materials which, without pretreatment, are always permeated with air.

It is thought that the invention and its advantages will

I claim:

1. Apparatus for filling a container with loose particulate material, comprising a plurality of narrow elongated tubes arranged within the container, means for feeding streams of the material through said tubes, power operated means for vibrating said tubes to compact the material as it travels therethrough, and means for withdrawing the tubes gradually from the container as the same becomes filled with compacted material.

2. Apparatus for filling a container with loose particulate material, comprising a platform for supporting the container, a conduit supported above the platform and having a lower portion extending downwardly into the container, such lower portion being subdivided into a plurality of narrow elongated tubes, means for vibrating said lower portion of the conduit and means for moving said lower portion of the conduit upwardly to withdraw it from the container.

3. Apparatus according to claim 2, including means for vibrating said platform.

4. Apparatus for filling a container with loose particulate material comprising a plurality of narrow elongated tubes arranged within the container, means for feeding streams of the material through said tubes, means for vibrating said tubes at a high frequency to compact the material as it travels therethrough, and means for withdrawing the tubes gradually from the container as the same becomes filled with compacted material.

5. A method of compacting and compressing pulverulent material such as corn or flour products or cement for the packaging thereof in valve bag packing machines comprising feeding said material in a unitary flow vertically through a stationary hopper, then subdividing said flow within said hopper into a plurality of separate individual vertical streams extending a predetermined distance, then subjecting said individual streams within said hopper to a vibratory action transversely to the flow of streams and then reuniting said individual streams into a single flow again within said hopper whereby the material is compacted, compressed and rendered more suitable for packaging with an economy of packaging material.

6. A method of compacting and compressing pulverulent material such as corn or flour products or cement for the packaging thereof in valve bag packing machines comprising feeding said material through a fixed stationary inlet tube in a unitary flow vertically, then subdividing said flow within said tube into a plurailty of separate individual streams by partitioning walls extending longitudinally of said flow, then subjecting said individual streams within said tube to a lateral vibratory action, then reuniting said individual streams into a single flow again within a fixed stationary outlet tube whereby the material is compacted, compressed and rendered more suitable for packaging with an economy of packaging material.

7. A method of compacting and compressing pulverulent material such as corn or flour products or cement for the packaging thereof in valve bag packing machines comprising feeding said material in a unitary flow vertically within a fixed stationary container, then subdividing said flow into a plurality of separate individual streams by partitioning walls extending longitudinally of said flow, then subjecting said walls to a substantially transverse vibratory action for forcing the particles in said individual streams into closer contact, then reuniting said individual streams within said fixed stationary container into a single flow again whereby the material is compacted, compressed and rendered more suitable for packaging with an economy of packaging material.

8. A method of compacting and compressing pulverulent material such as corn or flour products or cement for the packaging thereof in valve bag packing machines comprising feeding said material in a unitary flow vertically in a fixed stationary hopper, then subdividing said flow within said hopper into a plurality of separate individual streams extending a predetermined distance, then subjecting said individual streams along their length to to a vibratory action within said hopper, then reuniting said individual streams into a single flow again within said hopper, then feeding said material shortly after being reunited into bags whereby the material is compacted, compressed and rendered more suitable for packaging with an economy of packaging material.

9. A method of compacting and compressing pulverulent material such as corn or flour products or cement for the packaging thereof in valve bag packing machines comprising feeding said material in a unitary flow in a fixed stationary hopper, then subdividing said flow into a plurality of separate individual streams by partitioning walls within said hopper extending longitudinally of said flow and for a predetermined length, then subjecting said individual streams to a vibratory action within said fixed hopper, then reuniting said individual streams into a single flow again, then feeding said material shortly after being reunited into bags held stationary whereby the material is compacted, compressed and rendered more suitable for packaging with an economy of packaging material.

10. A method of compacting and compressing pulverulent material such as corn or flour products or cement for the packaging thereof in valve bag packing machines comprising feeding said material in a unitary flow vertically, then subdividing said flow within a fixed hopper into a plurality of separate individual streams by partitioning walls extending longitudinally of said flow, then subjecting said walls to a vibratory action within said fixed hopper for forcing the particles in said individual streams into closer contact towards the centers of said streams, then reuniting said individual streams into a single flow again, then feeding said material shortly after being reunited into bags whereby the material is compacted, compressed and rendered more suitable for packaging with an economy of packaging material.

11. A process for treating of poured material in filling devices, in particular of granular or mealy poured material, comprising subdividing the poured material within a fixed stationary container before filling a receptacle into partial masses and mechanically vibrating within said stationary container the partial masses towards the centers thereof to compact the same, then combining the partial masses after they leave the compacting zone and then filling and weighing a receptacle with said partial masses.

12. A process as claimed in claim 11, wherein the degree of compaction of the poured material is regulated by varying the height and the subdivision of the compacting zone.

13. A process as claimed in claim 11, wherein the degree of compaction of the poured material is regulated by varying the frequency of vibration of the compacting zone.

14. Device for treating material to be packaged in valve bag filling machines, especially corn, cement, or flour products comprising means for compressing said material in a compression zone comprising a fixed stationary container, a plurality of chutes formed by partition walls within said container, means for subjecting said walls to vibratory movements substantially transverse to the flow of material and the length of said walls are so proportioned in the direction of flow of the material that the material upon passing through said chutes is compressed to a predetermined extent and means for filling and weighing a container with said compressed material therein.

15. A valve bag packing machine for filling a sack with loose solid material, comprising packaging means, a fixed hopper adjacent said packaging means and communicating therewith, said hopper having a plurality of passages therein through which, when said apparatus is in use, the filling material is forced to run, means for subjecting the material while in said passages to lateral vibrations while said hopper is unaffected thereby, a vibrating device connected to said hopper for vibrating said passages, and means for varying the speed of said vibrating device.

16. A valve bag packing machine for filling a sack with loose solid material, comprising a hopper, a box-like casing in said hopper and communicating therewith, said casing having passing therethrough a plurality of passages through which, when said apparatus is in use, the filling material is forced to run, elastic means for holding said casing in said hopper, means for vibrating said casing transversely to the flow of material without affecting said hopper, and a vibration-exciting device mounted on said hopper for vibrating said casing.

17. Apparatus for compacting loose particulate material, comprising a plurality of narrow elongated tubes, means for feeding streams of such material through said tubes, power operated means for vibrating said tubes to compact the material therein, and a vessel communicating with the output ends of said tubes in which the individual streams of material may be reunited to form a composite mass, said tubes being formed from a large tube subdivided by a first series of parallel partitions and a second series of parallel partitions extending substantially transversely to the first series.

18. A valve bag packing machine for loose particulate material such as cement, flour or the like, comprising a stationary hopper, a plurality of narrow elongated tubes in said hopper, means for feeding streams of such material through said tubes, power operated means for vibrating said tubes without affecting said hopper to compact and deaerate the material therein, a fixed vessel communicating with the output ends of said tubes in which the individual streams of material may be reunited to form a composite mass, means for filling a container with said composite mass and means for weighing the same.

19. A packing machine according to claim 18, wherein the lengths of said tubes are variable, whereby the degree of compression of the material may be varied.

20. A packing machine according to claim 18, wherein said tubes are formed from a large tube sub-divided by a plurality of partitions.

21. A packing machine according to claim 18, wherein the vibrating means are connected to vibrate the tubes substantially transversely to their longitudinal axes.

22. A valve bag packing machine for filling a container with loose particulate material such as cement, flour or the like, comprising a fixed hopper, a plurality of narrow elongated tubes within said hopper, means for feeding streams of such material through said tubes, power operated means for vibrating said tubes while said hopper remains stationary to compact and deaerate the material therein, and means for reuniting said streams and feeding the composite stream into the container.

23. A valve-bag packing machine for packaging loose particulate material such as cement, flour and the like, comprising a fixed stationary hopper, a plurality of narrow elongated tubes within said hopper, means for feeding streams of such material through said tubes, means for vibrating said tubes at a high frequency to compact and deaerate the material therein while said hopper remains fixed and stationary, a vessel communicating with the output ends of said tubes which is also fixed and stationary in which the individual streams of material may be reunited to form a composite mass and means for filling and weighing a container with said composite mass therein.

24. Apparatus according to claim 23 wherein the vibrating means are connected to vibrate the tubes substantially transversely to their longitudinal axes.

25. Apparatus for treating material to be packaged in filling machines, especially corn, cement, or flour products comprising a fixed hopper, means for compressing and deaerating said material in a compression and deaeration zone within said hopper having a plurality of chutes formed by partition walls, and means for subjecting said walls to vibratory movements without affecting said hopper, the length of said walls being so proportioned in the direction of flow of the material that the material upon passing through said chutes is compressed and deaerated.

26. A method of treating loose solid material, comprising dividing said material into partial masses, mechanically vibrating said masses to compress and deaerate them, reuniting said compressed and deaerated partial masses, a measured quantity of said loose material, which, in the compressed condition, completely fills a container thereof, being held in and above said container and being compressed by a shaking device which initially lies near the bottom of said container and which is lifted out of the container as compressed and deaerated layers are formed.

27. A method for deaerating and compacting granular and flour-like material, such as cement, flour or the like in the hopper of a valve bag packing machine, comprising passing the material in a continuous stream vertically through the stationary hopper of a valve bag packing machine, dividing said stream in the hopper into a plurality of individual streams of substantial and predetermined length, mechanically vibrating the individual streams without affecting said hopper in the hopper vertically to the direction of the streams, then reuniting said streams within the hopper to a single stream and subsequently filling the deaerated and compacted material into valve bags thereby materially saving packing material.

28. A method for deaerating and compacting granular and flour-like material such as cement, flour or the like in the hopper of a valve bag packing machine, comprising passing the material in a continuous stream vertically through the stationary hopper of a valve bag packing machine which is divided by partitions of substantial and predetermined length into a plurality of passages for dividing the stream of material into a plurality of individual streams, vibrating said partitions with the particles contained therein vertically to the direction of said stream whereby the individual particles are closely contacted with each other by closely assembling toward the center of the stream, then reuniting the individual streams into a single stream after passing the vibration zone in the hopper, and subsequently feeding the deaerated and compacted material into valve bags thereby substantially saving packing material.

29. Valve bag packing machine for filling granular and flour-like material such as cement, flour or the like into valve bags, comprising a filling device, a hopper disposed above said filling device and communicating therewith, the interior of said hopper being divided over a substantial length into a plurality of passages through which the material must pass during the operation of the machine, and a vibration generator arranged on the outside of said hopper which imparts vibrations extending vertically to the direction of flow to said passages and the material contained therein without imparting vibration to said hopper.

30. Valve bag packing machine for filling granular and flour-like material such as cement, flour or the like into valve bags, comprising a filling device, a hopper disposed above said filling device and communicating therewith, said hopper having at the interior an insert which divides the interior of said hopper by partitions over a substantial length into a plurality of passages through which the material must pass during the operation of the machine, resilient means by which said insert is secured to said hopper, and a vibration generator arranged on the outside of said hopper which imparts vibrations extending vertically to the direction of flow to said insert and the material contained therein.

References Cited in the file of this patent

UNITED STATES PATENTS

| | | |
|---|---|---|
| 1,158,623 | Brantingham | Nov. 2, 1915 |
| 1,204,163 | Rusebauch | Nov. 7, 1916 |
| 1,563,722 | Carlson et al. | Dec. 1, 1925 |
| 1,566,746 | Herman | Dec. 22, 1925 |
| 1,881,106 | Vogt et al. | Oct. 4, 1932 |
| 2,003,417 | Andreas | June 4, 1935 |
| 2,149,790 | Roesch | Mar. 7, 1939 |
| 2,209,143 | Tolman | July 23, 1940 |
| 2,273,330 | Robinson | Feb. 17, 1942 |
| 2,323,864 | Weyant | July 6, 1943 |
| 2,381,505 | Lindholm | Aug. 7, 1945 |
| 2,583,862 | Lichtenstein | Jan. 29, 1952 |
| 2,674,396 | Peterson | Apr. 6, 1954 |